United States Patent [19]

Mills

[11] Patent Number: 4,815,119

[45] Date of Patent: Mar. 21, 1989

[54] TESTING TRANSMISSION LINKS

[75] Inventor: Bernard S. E. Mills, Newport, Great Britain

[73] Assignee: STC PLC, London, England

[21] Appl. No.: 117,745

[22] Filed: Nov. 4, 1987

[30] Foreign Application Priority Data

Nov. 5, 1986 [GB] United Kingdom ............... 8626453

[51] Int. Cl.$^4$ .............................................. H04M 3/26
[52] U.S. Cl. .................................. 379/29; 340/825.52
[58] Field of Search .................. 379/29, 372, 399, 22; 371/22; 340/825.52, 825.53, 825.63; 178/2 R, 2 B, 2 C

[56] References Cited

U.S. PATENT DOCUMENTS 3,943,305 3/1976 Hagedorn ............................ 371/22
4,258,236 3/1981 Conkin ................................. 379/22
4,686,696 8/1987 Lynch ............................... 379/29 X

FOREIGN PATENT DOCUMENTS 1212908 11/1970 United Kingdom .
1409293 10/1975 United Kingdom .
2019167 10/1979 United Kingdom .
2149616 10/1987 United Kingdom .

Primary Examiner—Stafford D. Schreyer
Attorney, Agent, or Firm—Lee & Smith

[57] ABSTRACT

A multichannel automatic remote line testing system enables telephone lines connected to a common highway to be individually tested from the exchange. Pulse code modulation of an audio tone provides address codes which are checked by the remote line testers and responded by the tester whose programmed address corresponds to the particular code sent. Validation circuits check the frequency, encoding and duration of the command.

Pulse Code modulation echoes are used to confirm interactive operation.

10 Claims, 5 Drawing Sheets

TYPICAL 7 BIT ADDRESS BYTE

CHARACTER STRING SHOWN 1001101

TYPICAL MULTI-SPUR ROUTE

TYPICAL 7 BIT ADDRESS BYTE
CHARACTER STRING SHOWN 1001101

LINE TRANSMISSION FORMAT
TONE WITH ADDRESS/ECHO 'MODULATION'

DETAIL OF LINE TRANSFORMER
AND REPRESENTATION OF LINE SWITCHING

UNIT DIAGRAM

TESTING TRANSMISSION LINKS

BACKGROUND OF THE INVENTION

This invention relates to testing transmission links, particularly but not exclusively telephone lines.

PRIOR ART

Our published British Pat. No. 2149616B describes an automatic remote line testing device for the subscriber's presmises which enables his telephone line to be tested from the exchange when the subscriber has equipment connected to the other end, even when the equipment is functioning incorrectly e.g. providing a short of open circuit.

This invention relates generally to the public switched network and provide a logic function switch which is highly selective as to the control frequency it responds to, thus virtually eliminating the possibility of false operation.

Both in the case of private networks and dedicated parts of the public network e.g. tie lines, circumstances arise where, due to spurs, private exchange etc., a plurality of paths may emanate from a common source to which customer owned apparatuses are connected at the end, and other techniques are required to provide multi-channel operation to test the several lines which may be connected.

Referring to FIG. 1 of the accompanying drawings, consider a common highway from point E which has a number of spurs with a number of nodes N1, N2, N3 etcetera whose status requires to be examined. The network presents the problem of routing in order to uniquely address any single node.

It has already been proposed to use multifrequency techniques to accomplish this by having at each node a remote line testing device responsive to a unique frequency or set of frequencies and then sending the unique information from point E in turn to individually test the route up to each node. This has proved to have drawbacks particularly having regard to the limited number of unique-frequency-responsive devices permissible within a telephone line baseband and the expense of making such devices. Also interference with other frequency sensitive apparatus connected to the line can occur.

U.S. Pat. No. 3,943,305 discloses telephone line testing equipment in which a series of alternating current tone pulses are transmitted from the central office point along the lines to a sensing means placed at a remote point in the circuit. The sensing means receives the codes tone pulse sequence decodes it to determine if the address is correct and if so what information is present, and then either connects or disconnects the remote equipment from the line or, alternatively, connects suitable loopback testing circuit to the line.

However, a problem arises with the technique disclosed because in order to synchronise the reading cycle a first pulse is always a "one", which limits the verstaility of the system.

OBJECT OF THE INVENTION

It is an object of the present invention to provide a system capable of multi-channel operation and which is cheaper to manufacture and more reliable in operation than hitherto, and also more versatile.

SUMMARY OF THE INVENTION

According to one aspect of the present invention there is provided a transponder for connection to a transmission link and remotely operable by a command signal sent via the link, the transponder comprising an interface between the link and equipment such as subscriber equipment which normally uses the link, an address decoding circuit for decoding binary coded address information comprising a uniquee time component modulated on said command signal and comprising a timed variable to differentiate between a "1" and a "0" of said code, and means for returning a return signal back along the link indicative of receipt of said command signal.

According to another aspect of the present invention there is provided apparatus adapted to be coupled to a link such as a telephone line and the like and to equipment, to connect or disconnect the equipment from the link in response to a command signal transmitted on the link from a location remote from the location at which the apparatus is located, the apparatus comprising:

switch means adapted to be coupled to the link and to the equipment so as to disconnect and connect the link and the equipment in respective switch states of the switch means;

frequency checking means for checking the frequency of the signal;

address decoding means for decoding an address code modulated on said command signal and having a timed variable to differentiate between "1" and "0" of the code;

means responsive to receipt of said command signal to change the switch state, and means responsive to receipt of said command signal to return a test signal back along said link, said address decoding means having a unique address stored therein so that several such apparatuses with different addresses can be separately controlled from the same link.

BRIEF DESCRIPTION OF THE DRAWINGS

In order that the invention can be clearly understood reference will now be made to the accompanying drawings in which.

DESCRIPTION OF THE PREFERRED EMBODIMENT

Figure 1:
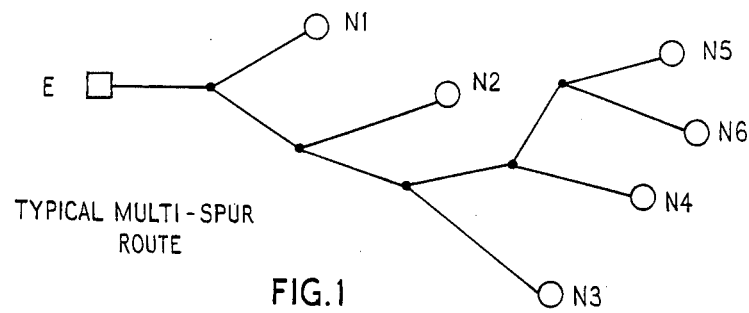
FIG. 1 shows diagrammatically a common highway with spurs having a number of nodes for testing to explain the invention as already referred to herein.

In the embodiment of the invention to be described a number of addresses is chosen which is appropriate for private wire and public switched networks in the UK, and is assumed to be in the range 50 to 100. Clearly other systems may have requirements outside this range but the present invention is thought to be still suitable. For convenience of this embodiment we shall consider 64, so chosen because it may be represented in binary form as a "7" bit binary number (7 bits permits up to 127 locations, or for example fewer locations with some bits assigned to other functions such as timed or latched operation).

For the format of the code signal it is proposed to use an assymetric mark-space coding. This represents the state of each bit with adequate time discrimination and in this particular embodiment a 3:1 and 1:3 arrangement is used. This is shown diagrammatically in FIG. 2 of the drawings where character 1 has a mark-space ratio of 3:1 and character 0 has a mark-space ratio of 1:3.

Figure 3:
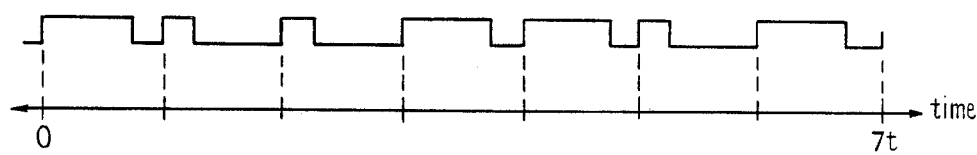
FIG. 3 shows a typical address block using the coding of FIG. 2.

A typical data block is shown in FIG. 3 and may represent the location "77", or some other prescribed location together with supplementary information for other purposes.

Figure 4:
FIG. 4 shows a line signal using the address format of FIGS. 2 and 3.

Such code signals can be transmitted via the line of e.g. FIG. 1 using a single frequency e.g. 2700 Hz as shown in FIG. 4 which is achieved as a simple modulation of the line frequency. Additional modulating frequencies may be used to expand the range of addresses and/or additional data.

Synchronising the coded signal at the remote line tester, is not essential in the present embodiment as the code chosen in instantly recognisable in the remote tester and synchronisation is achieved from the code format.

Synchronisation is taken from the commencement of each tone and thus "frame up" of the code format for suitable decoding is unnecessary. Further timing ensures that only complete data formats are acceptable.

It is proposed that the complete data block shall occupy a time span of $7 \times 320$ msec (2.24 seconds). The timing is chosen to adequately cater for tolerance of the send tone and the likely phase distortion of transmission.

Each data bit, from the foregoing, thus occupies a time slot 320 msec. If, further a binary "one" is represented by a mark of ¾ time slot then its duration will be:

$$(\tfrac{3}{4} \times 320) \text{ msec} = 240 \text{ msec}.$$

In the same way a binary "zero" has a mark of ¼ time slot:

$$\text{Duration} = (\tfrac{1}{4} \times 320) \text{ msec} = 80 \text{ msec}$$

If bit decoding was a simple counting scheme based on cycles of 2700 Hz carrier then counts of:

$$T \div 1/f$$

$$240 \times 10^{-3} \div 1/2700 = 648 \text{ pulses} = \text{CHAR 1}$$

and $$80 \times 10^{-3} \div 1/2700 = 216 \text{ pulses} = \text{CHAR 0}$$

need to be established.

Additionally, if a tolerance is admitted for the carrier frequency of ±25 Hz, and also partial cycle counting error, then acceptable counts are:
CHAR 1=642, 654
CHAR 0214, 218

All counts outside the ranges will be regarded as invalid data and will result in complete dismissal of received code.

Other modulating frequencies are accommodated by appropriate selection of other pre-fixed counting decoders.

At the point E in FIG. 1, for example a telephone exchange, will be a system for addressing the transponder at the multiple subscriber locations. The system will have a scanning and sequencing system to automatically scroll around some or all of the various subscribers to test the lines on an automatic basis for everybody or on a selective basis. This is shown schematically in FIG. 1.

Figure 8:
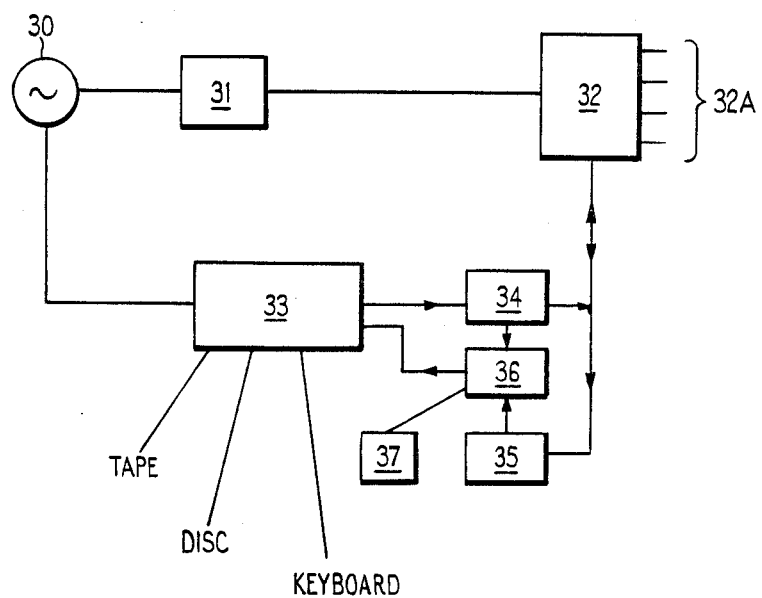
FIG. 8 shows schematically the transmission equipment located at E in FIG. 1.

Referring to FIG. 8 an oscillator 30 feeds a modulator 31 feeding into a switching arrangement 32 having multiple outputs 32A. A control box 33 in the form of a computer is controlled by either a tape, disc or keyboard for providing the sequencing of the coded signals and scanning the output lines 32A to couple the signals to the desired line 32A. It also controls the oscillator 30 to provide the desired frequency A, B, C or D and the modulator 31 to provide the various coded formats, like that of FIG. 4, with the switch 32.

A store 34 stores the last coded message sent and a second store 35 stores the returned "echoed" signal. A comparator 36 compares the two and if the comparison is satisfactory, triggers the computer 33 to continue. If the comparison is not satisfactory an alarm 37 is raised.

Receipt of valid code will cause an "Answer back signal" to be generated. The "answer back" signal will be an echo of the transmitted command but using a return modulating frequency of 800 Hz. Thus the actual tester responding can be identified.

Such an echo signal is readily correlated with the originally transmitted code to provide a path check.

Additionally the mode of operation of the remote tester can be remotely detected.

Figure 6:
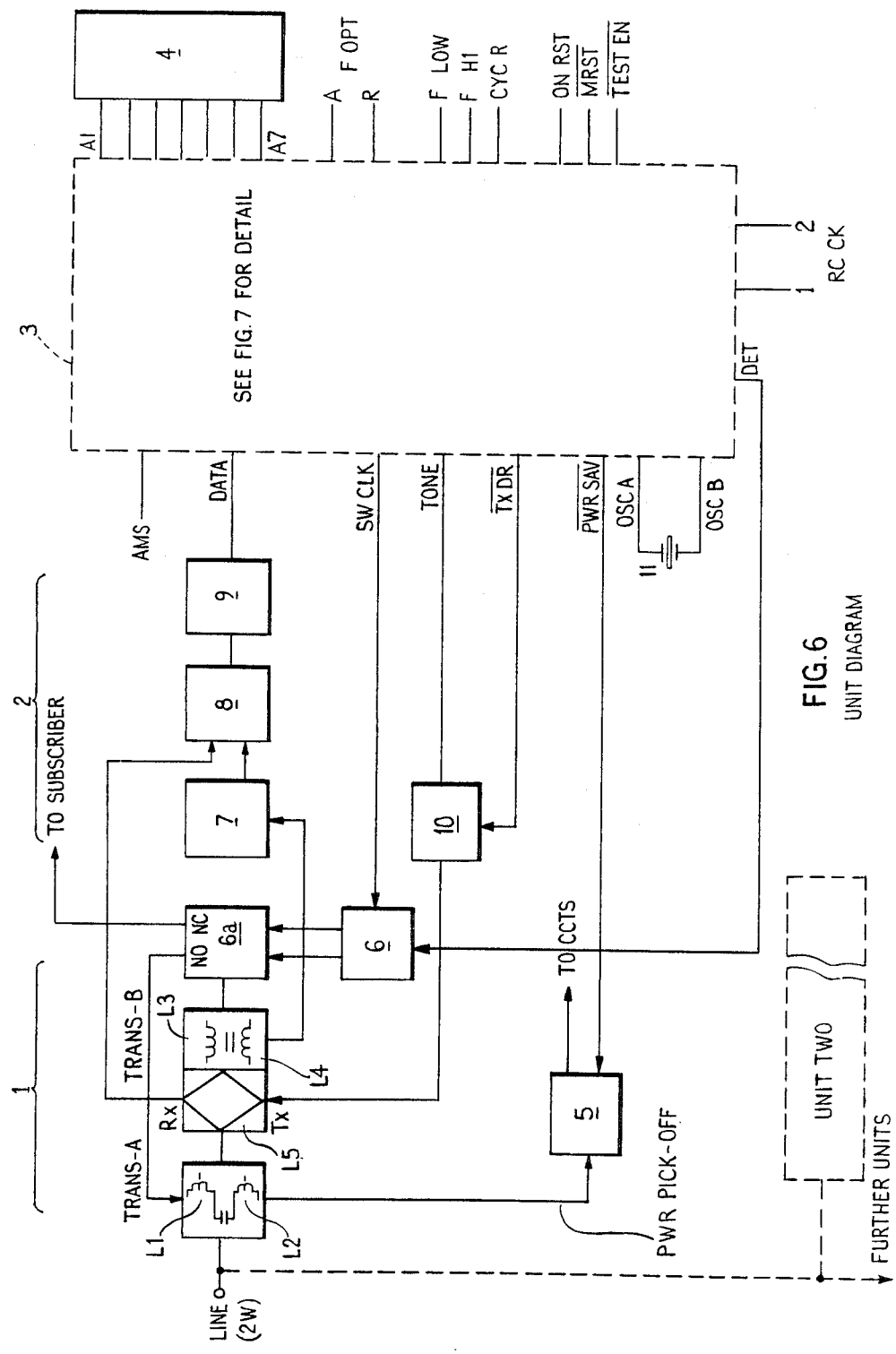
FIG. 6 shows the block diagram of a remote line tester according to an embodiment of the invention.
Figure 7:
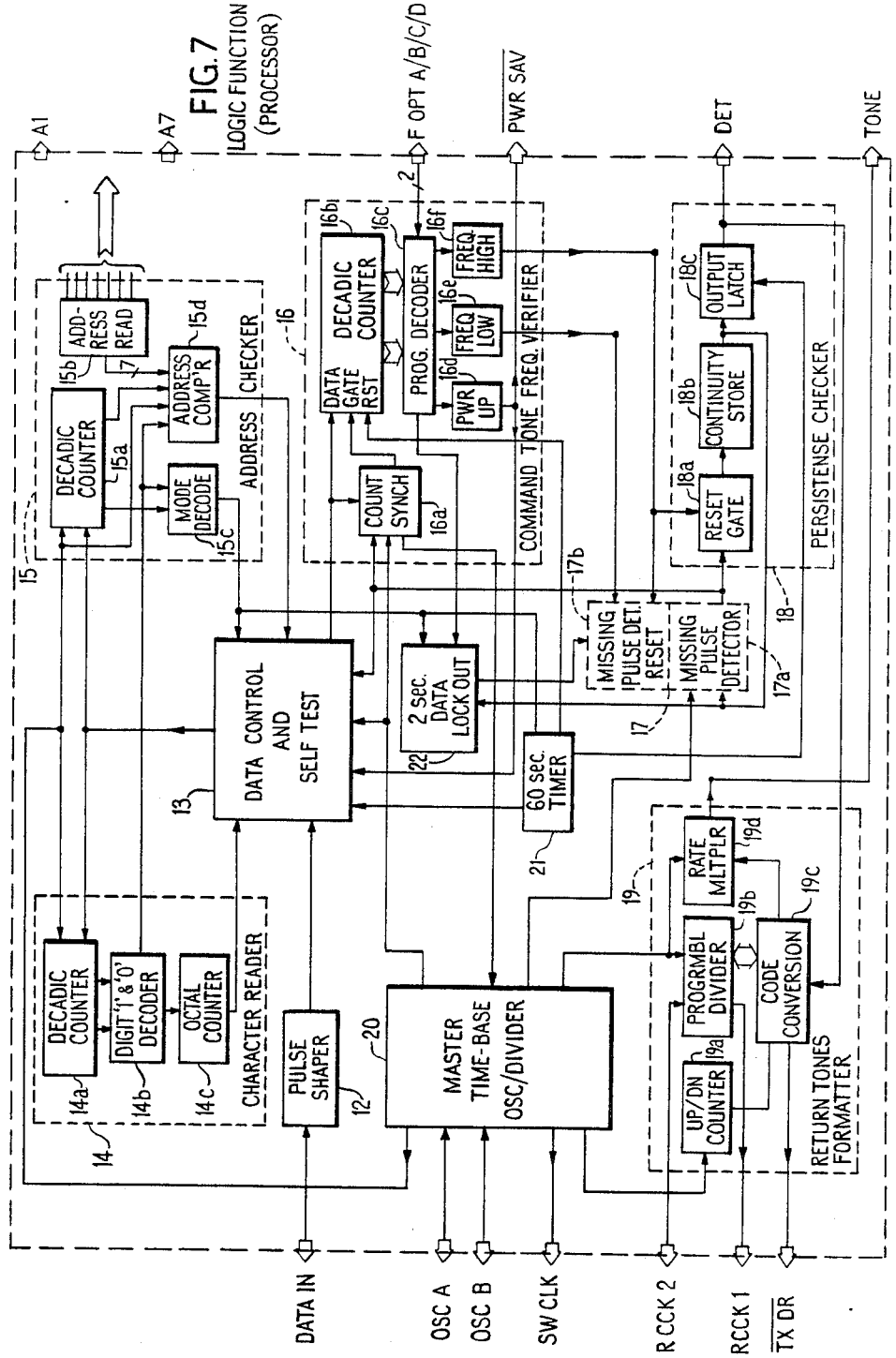
FIG. 7 shows a block diagram of one example of the processor 3 of FIG. 6.

A simplified block diagram of the proposed remote line tester unit and one example of the processor is illustrated in FIGS. 6 and 7 respectively.

The remote line tester responds to the coded command tone sent from the exchange having a preset frequency and a preset minimum duration which is checked and the coded format which is also checked and the tester recognises the signal and only this signal to provide an answer back coded tone on the pair of telephone wires. It must not of course interfere with the normal usage of the line. Thus when it is desired to known "where" a location is, the system of FIG. 1 is asked "where is this location" by sending the coded address with the system, and the appropriate location having that unique address will respond.

Referring to FIG. 6 of the drawings, the tester comprises four sections, namely the line transformer and power extraction circuits 1, the command tone and test signal interface circuits 2, the command tone processor 3, which in this embodiment is realised in integrated circuit form, the address decoder 4.

Figure 5:
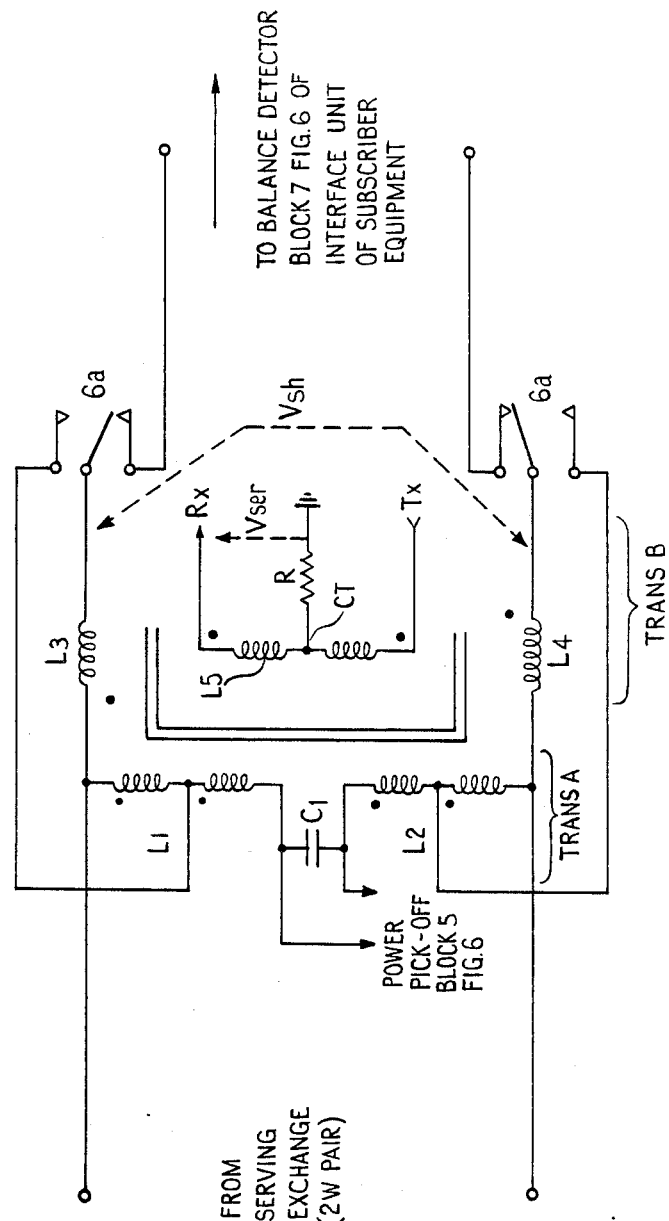
FIG. 5 shows the line transformer and a representation of the line switching to one embodiment of the invention.

The line transformer and thereby the power extraction circuits 1 (shown in more detail in FIG. 5) are connected to the 2-wire line (2 W line) from the Exchange. Part of the line transformer TRANS-A comprises primary winding, $L_1$ and $L_2$ and coupling capacitor $C_1$ for providing DC separation and AC coupling between the primary windings $L_1$, $L_2$.

DC from the exchange is applied to a series regulator 5 which provides regulated DC to the various circuit components of the transponder.

In series with the line are automatic disconnect switches 6a, and the second part of the transformer TRANS-B incorporating series windings, $L_3$, $L_4$ and a centre-tapped hybrid winding $L_5$. The series windings $L_3$, $L_4$ permit d.c. to be fed to the subscriber's equipment with normal line signals, and are also used to couple the interrogation signal (the data block) to the hybrid winding $L_5$ and thence to the sum/limiter amplifier 8.

The balanced detector 7, connected transversely across windings $L_3$ and $L_4$ will "see" a degree of voltage dependent upon the level of termination, its output also being fed to the sum/limiter amplifier 8, to complement the "current" induced signal obtained from $L_3$ and $L_4$.

Under any of these conditions the interrogation from the exchange will cause an answer back coded test tone to be returned to the exchange via return tones formatter 19 while the subscriber's equipment is automatically disconnected for the period of the test (in one option of this embodiment 60 secs.) Latched disconnection can be achieved for testing of longer duration or other purposes such as customer default disconnection.

When the switches 6a is activated the change-over action to parallels $L_3$ with a portion of $L_1$, and similarly $L_4$ with $L_2$, to now present the correct source/terminating impedance to the circuit. The subscriber is disconnected for the duration of the test. The hybrid windings $L_5$ are effectively divided into a transmit portion Tx, for transmitting the test tone format, and a receive portion Rx for receiving the interrogation signal, by a centre tap CT to earth via a resistor R, in this embodiment 300 ohms. In one option of this embodiment when the line is being interrogated, the system is timed, requiring only one command to initiate looping through switch 6a, the transponder restoring to the unlooped condition after a finite time has elapsed. During this time an 800 Hz tone is emitted via the transmit Tx hybrid winding $L_5$.

The automatic loop circuit is provided by switches 6a driven from the decoded command tone of say 2700 Hz transmitted from the serving exchanged via the line.

In a further option of this embodiment the switch is latched. A subsequent coded command tone is thus used to release the switches. During the latched state an alternative return tone of 1600 Hz is transmitted. It is a feature of the hybrid winding $L_5$ as coupled to the transmit/receive windings $L_1$ and $L_2$, in this case, paralleled by $L_3$ and $L_4$, respectively, to distinguish between the interrogative format and the echosed returned test tone format and thereby prevent the receiver from being corrupted by transmission of test tone format.

The switches can be in the form of a relay with changeover contacts 6a or a "solid state" equivalent where "fail-saft" action in the event of power failure is achieved by particular semiconductor technology, for example a novel isolated gate FET switch mechanism.

The interface circuits 2 in conjunction with the balanced line transformer TRANS together with a balanced input voltage amplifier 7 (input buffer) and summing/limiter amplifier 8 are arranged that irrespectively of whether the customers' apparatus presents:
(i) its correct terminating impedance,
(ii) an open circuit,
(iii) a short circuit,
then a substantially constant voltage is obtained in the summing amplifier 8. Hence line test operation is ensured under all customer conditions inclusive of a fault.

The interface circuits 2 operate in dependence upon the principles employed in the line transformer. For an understanding of the circuitry consider the voltages/currents in the transformer windings, with reference to FIG. 5, during the three customer operation states mentioned above.

(i) For a correct termination a given current flows in the series line windings $L_3$, $L_4$ which therefore induces a known voltage $V_{ser}$ in the suitably phased hybrid winding $L_5$. Also a known voltage $V_{sh}$ appears across the customer termination which is sensed by the differential input buffer 7. The results of these two signal paths are dealt with in the summing amplifier 8 in a fixed ratio. This ratio is so chosen to preserve a given summed voltage.

(ii) For the open circuit case no current flows in the series windings $L_3$, $L_4$ and hence no voltage ($V_{ser}$) is induced in the hybrid winding of the transformer but the load voltage ($V_{sh}$) of the first case (i) is doubled.

(iii) In the closed circuit the current in the series windings $L_3$, $L_4$ and hence the voltage ($V_{ser}$) induced in the transformer hybrid winding $L_5$ is doubled with respect to the first case (i) but here there is no voltage ($V_{sh}$) input in the differential amplifier.

The overall mechanism is such that in the three cases, and equally for all partial terminations, a reasonably constant voltage is derived at the input to the summing amplifier 8, and thereby, independance of any termination.

The summing amplifier 8 is also configured as a limiter to provide approximately constant drive to the processor.

Noise immunity is enhanced by a bandpass filter 9 centred at 2700 Hz, or other elected frequency. The signal from the interface circuit 2 is fed to the command tone processor 3. This circuit is realised as a semi-custom integrated device using low power technology.

The circuit has two principle parts, the decoder and the companion return tone(s) generator. The decoder section "reads" the data submitted and responds with its generator circuitry if correct address comparison is executed. Mode setting is a subservient function. The complete circuit is functionally controlled by a highly stable master clock which in this embodiment operates at 4096 kHz.

The principle of the decoder is that of a sampling frequency counter with programmed bounds to establish correctness of frequency and data format.

Referring to FIG. 7 the input frequency of say 2700 Hz from the filter 9 of FIG. 6 is applied to a pulse shaper 12 and has the format shown in FIG. 4. The output of the shaper 12 which provides a square wave from the envelope for each block is fed to a data control 13.

The input signal is fed via the data control circuit 13 to a command tone frequency verifier 16, containing a decadic counter 16b. The gate input to this counter receives a timing signal from a sync circuit 16a which synchronises a master time base divider 20. This gates the counter on for a period of 240 msec. and off for a period of 80 msec. During the "on" counting phase the input frequency, if correct, will cause the counter to accumulate a known number of counts. The decoder 16c which operates in three bit mode is arranged to "look" for predetermined counts above and below this number representative of a band of frequencies. In this way finely toleranced frequency limits can be set. External logic signals preset by the user to select the operating frequency (F OPT) frequencies to allow the decoder to operate at any of four prefixed frequencies A, B, C and D. A simple biassing signal achieves this.

An "in range" frequency causes the decoder 16c to provide a pulse every 320 msec via the frequency low/normal circuit 16e to the persistence checker 18 comprising a reset gate 18a, a continuity store 18b and an output latch 18c. The checker is further controlled by a missing pulse detector 17a and its associate reset mechanism 17b. An absent pulse in the required train resets the continuity store 18b to zero.

Out of range frequencies are discriminated against in the following ways:

(i) Where the frequency is too high then the decoder 16c gives an output via the frequency high circuit 16f to a reset gate 18 which is effective to reset the continuity store 18b. Thus this store will not count more than one pulse and the output latch 18c will not be set.

(ii) Where the frequency is too low, or indeed absent, then the decoder 16c will not provide pulses to the frequency low/normal circuit 16e. This in turn will not provide pulses for the timer 17. This circuit, the missing pulse detector 17a, acts as a re-triggerable monostable with a period in excess of 320 ms (in this embodiment 420 ms). If the timer 17 is not reset it changes state to create, via reset gate 18a, a reset of continuity store 18b. Thus the absence of a single count or more is accommodated, thereby ensuring the detection of breaks in transmission of short duration. This provides a high degree of immunity to misoperation.

Figure 2:
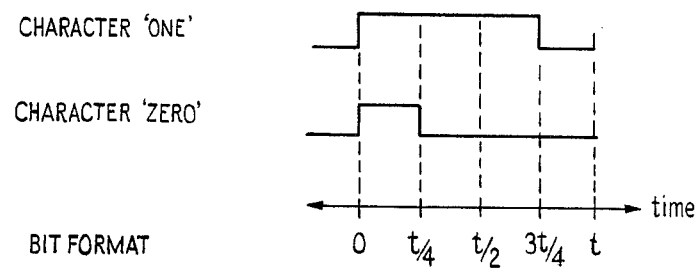
FIG. 2 shows a mark-space coding for the code signals according to an embodiment of the invention.

In the same time frame as the command tone verifier 16 and persistence checker 18 are operating on the first piece of code, two further parallel functions take place. They are: The code length and format is checked to establish its data content. This is performed in the character reader 14 to determine whether the digit "1" or "0" is being represented character "1" in this embodiment being three times as long as character "0" as shown in FIGS. 2, 3 and 4. The character reader sequentially decodes digits in 320 msec. periods and passes them to the address checker 15. The address checker compares successively loaded digits in its comparator 15d for complete address parity with pre-written data in its input reader 15b as determined by the signature key 4 (FIG. 6) connected to the address reader by connections A1 to A7. The signature key contains the prescribed address and can be in the form of simple switch-type strappings which "enable" the address checker 15, or can be more complex in the form of a PROM or EPROM device. When the transponder is installed, the prescribed address is written into block 4, either pre-written or written by the installer.

In this embodiment the address byte is seven bits in length, one bit of which is used to determine "mode". A sub-section of the address checker is the mode decoder 15c. This decodes a dedicated bit of the address byte to specifically control the operating mode, timed or latched, of the complete transponder. A complete cycle of decoding thus occupies 7×320 msec (2.24 sec) and loads the continuity store 18b of the persistance checker 18 and, in turn, sets the output latch 18c. The output latch provides a command to the return tones formatter 19, whose action is detailed later.

Thus the prescribed address is examined against the input signal information in "time" terms. The ones and zeroes of the input signal are read and stored, and compared with the format of ones and zeroes over a plurality of bits (seven) as preloaded in the address key. Each bit is checked for frequency (16c) and duration is parallel in real time.

A further circuit, a two second data lockout 22 also makes use of the missing pulse detector 17 properties. When the condition arises that:
(a) The output latch 18c has operated and
(b) Command tone format has ceased (determined as detection of absence of tone by change of state of the detector 17,
then the two second data lockout comes into play.

When initiated it acts on the data control 13 to accept an alternative data source provided by the master timebase 20. This is fed to the decadic counter 16b to be decoded by a subsection of the decoder 16c. The count, representative of the time span 2 seconds, uses a number smaller than those adopted for format checking in order not to create any unwanted states in the persistence checker 18 or reset activities from the reset gate 17b.

The termination of the count sequence reestablishes the data input via the data control 13 and resets the persistence checker 18. The cycle of command interrogation may now be repeated to either repeat the latch setting or releasing sequence depending upon selected mode.

The reset circuitry is carefully arranged such that in addition to out of range frequencies not operating the latch 18c, the loss of a single address bit (or more) in the sequence of seven bit address byte gives an invalid result. For example, a short break or interruption in transmission of the command format might occur, and this is to be rejected as invalid. This provides a high degree of immunity to misoperation. In addition the nature of the address format preludes false operation from say modems having carriers at or near the operating frequency.

In the timed mode from the point of address validation previously described as the setting of the output latch an instruction is passed to the mode 15c via the data control 13 to activate the 60 sec timer 21. The 60 second timer takes input from the time base 20. On reaching count maturity it provides a signal to reset the output latch 18c thereby disabling line switch driver 6 and the line switches 6a.

The return tones formatter 19 echoes the transmitted code at one of two frequencies depending on the selected mode. For timed operation 800 Hz is echoed and for latched operation 1600 Hz is returned.

Thus the returned tone is modified in two ways: it is truncated as an echo of the incoming i.e. transmitted code from the central station, and in order to avoid possible filtration problems where different frequencies might have been used as return tones, the formatter 19 creates a "synthetic" sine wave in digital form, so no external filters are required. Thus block 10 (FIG. 6) is not a tuned stage but a simple amplifier.

The formatter comprises an up-down counter 19a, a programmable divider 19b and rate multiplier 19d. These elements operate together as a piecewise sine wave approximator. The code conversion (19c) section imposes the echoed address on the constructed wave.

The formatted echo tone is fed to the transmit amplifier 10 where powering is controlled by a logic signal enabled when transmission commences.

The processor is designed so that data guarding occurs i.e. the output of the return tones formatter is prevented from reaching the "receiver" decoding circuitry.

Two further features of the circuit are respectively Power Save PWR SAV and Auto/Manual Select AMS. Power Save is derived from a subsection of the command tone frequency verifier 16, power up 16d and, during line idle conditions, "strobes" power via the power pick off circuit 5 to circuits 7, 8, 10 and 19 forming analogue receiver circuitry. In response to a recognised tone circuit 16d "latches" power on.

The command tone frequency verifier 16 is always looking at the line. If power saving feature PWR SAV is used the chip is told by its own clocks to "wake up" and "go to sleep" on a continual basis, within the data control and self test section 13. If an input signal arrives during a "sleep" period, and consequently the transponder misses an initial portion of the signal, it "expects" the exchange to transmit the signal a second time, and "stays awake" to receive the second transmission in full. The power saving feature is necessary if the operating administration sets a current limit for such transponders to draw from the line or where the equipment is locally powered and does not have the line power pick-off.

This is done by the command tone frequency verifier 16 PWR UP circuit 16d which detect counts from the decoder 16c and in consequence causes the power saving action to cease and the circuits are powered continually for as long as counts are detected. The count detection is a very short time decoder which detects the signal frequency over a period of time shorter than the coded signal i.e. shorter than a 320 msec time slot.

The Auto/Manual Select is an "embedded" self test feature needing a local command to activate the data control (13) to internally "loop" the transponder to verify address reading and echo coding.

The processor can be used not only to operate an auto return signal facility such as loop-back or coded 800 Hz signal in response to an input frequency of predetermined parameter. The processor could be used to remotely operate some other device where a high degree of immunity to misoperation is important.

The processor 3 can be realised in integrated circuit form as a custom uncommitted logic array.

The invention described is applicable anywhere a line is a common bearer to more than one recipient, e.g. a party line.

It is also proposed to have more than one frequency for carrying code signals. Thus if four frequencies were used then that would provide 4×128 possible addresses, and then receive line circuits in FIG. 6 would be adapted for whichever frequency the tester is intended for. For this proposal it is intended to have filters 9 which are selectable when the equipment is commissioned so that only one of the four frequencies is received for decoding.

Further it is to be understood that the invention is also applicable to other transmission media such as optical or radio, provided the demodulation within that system derives the original audio base tones. In such an arrangement the transponder would be locally powered and therefore the power pick-off shown in FIG. 5 would not be necessary.

I claim:

1. A transponder for connection to a transmission link and remotely operable by a command signal sent via the link, the transponder comprising an interface between the link and equipment such as subscriber equipment which normally uses the link, an address decoding circuit for decoding binary coded address information comprising a unique time component modulated on said command signal and comprising a timed variable to differentiate between a "1" and "0" of said code, and means for returning a return signal back along the link indicative of receipt of said command signal.

2. A transponder as claimed in claim 1 wherein the modulation is an envelope modulation in the form of an assymetric mark-space ratio.

3. A transponder as claimed in claim 1, wherein the frequency of the tone is checked by counting the number of cycles received between first and second time limits, and the address code is checked by counting the number of cycles received during a preset period corresponding to the length of a modulation character.

4. A transponder as claimed in claim 1, wherein power to circuits of the transponder is switched on and off, and remains off for a period shorter than the length of the coded command signal, so that part of the received signal will always be received and the transponder is responsive to receipt of part of the signal to maintain power on continuously until the signal has been repeated.

5. A transponder as claimed in claim 1, wherein the transponder has a return tones formatter which modulates a return tone with the same address code as the received signal.

6. A transponder as claimed in claim 1, comprising a character reader which sequentially decodes digits in prescribed character length periods, and an address checker which receives the decoded digits and has a comparator which compares the decoded digits with pre-written address data.

7. A transponder as claimed in claim 1, wherein one bit of the address code is used to determine mode of operation of the transponder, and a mode decoder decodes the mode bit to select the mode of operation e.g. latched or timed.

8. A transponder as claimed in claim 1, the transponder having a continuity store and a complete cycle of decoding loads the continuity store and sets an output latch which provides a command in response thereto to send the return signal.

9. A transponder as claimed in claim 1, wherein the interface has a switching arrangement by which subscribers apparatus is connected to the transmission link, and wherein the transponder will operate the switching arrangement to disconnect the subscribers apparatus from the transmission link while the transponder is being interrogated by the command signal.

10. Apparatus adapted to be coupled to a link such as a telephone line and the like and to equipment, to connect or disconnect the equipment from the link in response to a command signal transmitted on the link from a location remote from the location at which the apparatus is located, the apparatus comprising:

switch means adapted to be coupled to the link and to the equipment so as to disconnect and connect the link and the equipment in respective switch states of the switch means;

frequency checking means for checking the frequency of the signal;

address decoding means for decoding an address code modulated on said command signal and having a time variable to differentiate between "1" and "0" of the code;

means responsive to receipt of said command signal to change the switch state, and means responsive to receipt of said command signal to return a test signal back along said link, said address decoding means having a unique address stored therein so that several such apparatuses with different addresses can be separately controlled from the same link.

* * * * *